United States Patent
Nishii et al.

(10) Patent No.: US 12,429,874 B2
(45) Date of Patent: Sep. 30, 2025

(54) AUTONOMOUS TRAVEL SYSTEM, AUTONOMOUS TRAVEL METHOD, AND AUTONOMOUS TRAVEL PROGRAM

(71) Applicant: Yanmar Holdings Co., Ltd., Osaka (JP)

(72) Inventors: Yasuto Nishii, Osaka (JP); Mamoru Takahashi, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 193 days.

(21) Appl. No.: 18/031,151

(22) PCT Filed: Sep. 13, 2021

(86) PCT No.: PCT/JP2021/033447
§ 371 (c)(1),
(2) Date: Apr. 11, 2023

(87) PCT Pub. No.: WO2022/085334
PCT Pub. Date: Apr. 28, 2022

(65) Prior Publication Data
US 2023/0376039 A1    Nov. 23, 2023

(30) Foreign Application Priority Data
Oct. 21, 2020   (JP) .................... 2020-176637

(51) Int. Cl.
G05D 1/00       (2024.01)
A01B 69/04      (2006.01)

(52) U.S. Cl.
CPC ......... *G05D 1/0212* (2013.01); *A01B 69/008* (2013.01); *G05D 1/0088* (2013.01)

(58) Field of Classification Search
None
See application file for complete search history.

(56) References Cited

U.S. PATENT DOCUMENTS

| 2019/0146513 A1 | 5/2019 | Tomita et al. |
| 2019/0239416 A1* | 8/2019 | Green .................. G05D 1/0219 |
| 2020/0064144 A1* | 2/2020 | Tomita ..................... B62D 6/00 |

FOREIGN PATENT DOCUMENTS

| EP | 3722905 A1 | 10/2020 |
| JP | 2012120449 A | 6/2012 |
| JP | 2017174229 A | 9/2017 |
| JP | 2018073050 A | 5/2018 |

(Continued)

*Primary Examiner* — Tamara L Weber
(74) *Attorney, Agent, or Firm* — Chris Mizumoto

(57) ABSTRACT

A farm field setting processing unit sets an inner peripheral work region and an outer peripheral work region in a farm field having a shape where a right side and a left side that face each other are not parallel to each other. A work-direction setting processing unit sets a work direction for a work vehicle within the inner peripheral work region. A path setting processing unit sets, within the inner peripheral work region, a travel path as a work initiating path at a location adjacent to the right side that is parallel to said work direction, from among a plurality of sides that define the inner peripheral work region. On the basis of the work direction and the travel path, a path generation processing unit generates a travel path for the work vehicle within the inner peripheral work region.

16 Claims, 15 Drawing Sheets

(56) References Cited

FOREIGN PATENT DOCUMENTS

| | | |
|---|---|---|
| JP | 6675135 B2 | 3/2020 |
| JP | 2020086877 A | 6/2020 |
| WO | 2018163615 A1 | 9/2018 |

\* cited by examiner

| WORK START POSITION | WORK START ROUTE | REQUIRED WORK TIME | OVERLAPPING WORK AREA |
|---|---|---|---|
| Sa | Rs1 | Ts1 | Ms1 |
| | Rs2 | Ts2 | Ms2 |
| Sb | Rs3 | Ts3 | Ms3 |
| | Rs4 | Ts4 | Ms4 |
| Sc | Rs5 | Ts5 | Ms5 |
| | Rs6 | Ts6 | Ms6 |
| Sd | Rs7 | Ts7 | Ms7 |
| | Rs8 | Ts8 | Ms8 |

AUTONOMOUS TRAVEL SYSTEM, AUTONOMOUS TRAVEL METHOD, AND AUTONOMOUS TRAVEL PROGRAM

CROSS-REFERENCE

This application is a US National Stage Application under 35 U.S.C. § 371 of International Application No. PCT/JP2021/033447 filed Sep. 13, 2021, which claims foreign priority of JP2020-176637 filed Oct. 21, 2020 and the disclosures of which are hereby incorporated by reference in their entirety.

TECHNICAL FIELD

The present invention relates to an autonomous travel system, an autonomous travel method, and an autonomous travel program for causing a work vehicle to travel autonomously.

BACKGROUND ART

In order to set a travel route for a work vehicle that can travel autonomously, an operator registers a farm field and then sets a first work region (an inner peripheral work region) in a central portion of the farm field and a second work region (an outer peripheral work region) on an outer side of the first work region. For example, Patent Literature 1 discloses a system that sets the inner peripheral work region and the outer peripheral work region and generates a travel route for autonomous travel of the work vehicle in each of the inner peripheral work region and the outer peripheral work region.

CITATION LIST

Patent Literature

Patent Literature 1: Japanese Unexamined Patent Application Publication No. 2018-147421

DISCLOSURE OF INVENTION

Problems to be Solved by the Invention

For example, in the case where a shape of the farm field to be worked is not rectangular but irregular, the following problem possibly occurs. For example, in the case where two opposite sides of four sides, which define the inner peripheral work region, are not parallel, an overlapping region (for example, an overlapping region X10 in FIG. 3) is possibly generated. In the overlapping region, a work path (a swept path) in the inner peripheral work region that is adjacent to a first side as one of the two opposing sides partially overlaps a work path (a swept path) in the outer peripheral work region that is adjacent to the first side. The generation of the overlapping region of work by the work vehicle leads to a problem of reduced work efficiency.

An object of the present invention is to provide an autonomous travel system, an autonomous travel method, and an autonomous travel program for generating a travel route capable of improving work efficiency.

Means for Solving the Problems

An autonomous travel system according to the present invention includes a work region setting processing section, a work direction setting processing section, a route setting processing section, and a route generation processing section. The work region setting processing section sets a first work region and a second work region in a farm field that is a work target of a work vehicle and has such a shape that at least one pair of opposing sides of plural sides defining the farm field is not parallel, the first work region corresponding to a shape of the farm field, and the second work region being positioned on an outer side of the first work region. The work direction setting processing section sets a work direction of the work vehicle in the first work region. The route setting processing section that sets a first travel route, on which the work vehicle first travels from a work start position in the first work region, at an adjacent position to a side, which is parallel to the work direction, of plural sides defining the first work region. The route generation processing section generates a travel route of the work vehicle in the first work region on the basis of the work direction set by the work direction setting processing section and the first travel route set by the route setting processing section.

An autonomous travel method according to the present invention is a method in which one or plural processors: set a first work region and a second work region in a farm field that is a work target of a work vehicle and has such a shape that at least one pair of opposing sides of plural sides defining the farm field is not parallel, the first work region corresponding to a shape of the farm field, and the second work region being positioned on an outer side of the first work region; set a work direction of the work vehicle in the first work region; set a first travel route, on which the work vehicle first travels from a work start position in the first work region, at an adjacent position to a side, which is parallel to the work direction, of plural sides defining the first work region; and generate a travel route of the work vehicle in the first work region on the basis of the work direction and the first travel route.

An autonomous travel program according to the present invention is a program for causing one or plural processors to: set a first work region and a second work region in a farm field that is a work target of a work vehicle and has such a shape that at least one pair of opposing sides of plural sides defining the farm field is not parallel, the first work region corresponding to a shape of the farm field, and the second work region being positioned on an outer side of the first work region; set a work direction of the work vehicle in the first work region; set a first travel route, on which the work vehicle first travels from a work start position in the first work region, at an adjacent position to a side, which is parallel to the work direction, of plural sides defining the first work region; and generate a travel route of the work vehicle in the first work region on the basis of the work direction and the first travel route.

Effect of the Invention

The present invention can provide the autonomous travel system, the autonomous travel method, and the autonomous travel program for generating the travel route capable of improving work efficiency.

DESCRIPTION OF EMBODIMENTS

The following embodiments are examples that embody the present invention, and are not intended to limit the technical scope of the present invention.

First Embodiment

Figure 1:
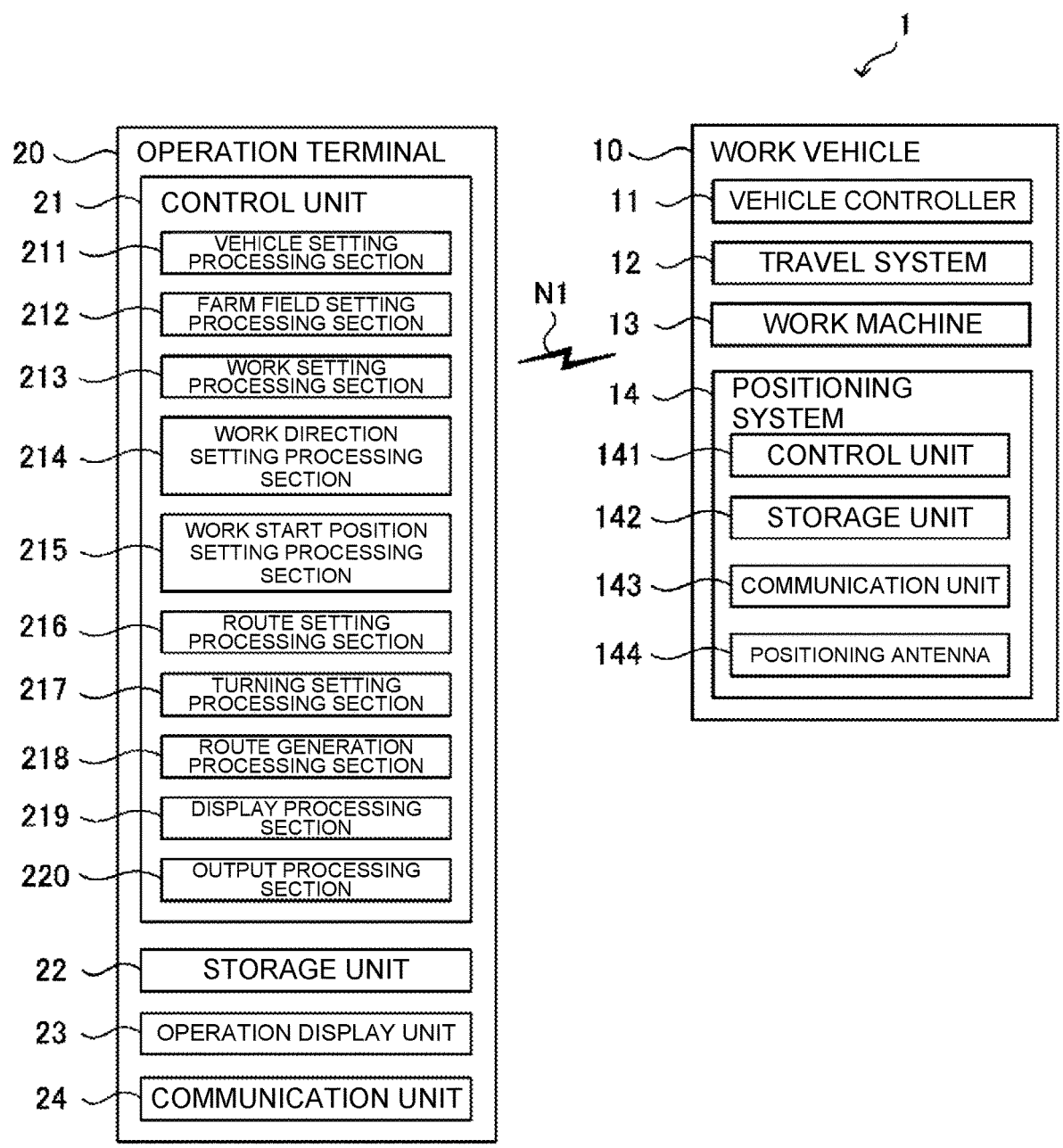
FIG. 1 is a diagram illustrating a configuration of an autonomous travel system according to a first embodiment of the present invention.

As illustrated in FIG. 1, an autonomous travel system 1 according to a first embodiment of the present invention includes a work vehicle 10 and an operation terminal 20. The work vehicle 10 and the operation terminal 20 are mutually communicable via a communication network N1. For example, the work vehicle 10 and the operation terminal 20 are mutually communicable via a mobile phone line network, a packet line network, or a wireless LAN (the Internet).

In the first embodiment, a description will be made on a case where the work vehicle 10 is a tractor as an example. As another embodiment, the work vehicle 10 may be a rice transplanter, a combine harvester, a construction machine, a snowplow, or the like. The work vehicle 10 is a so-called robot tractor having a configuration that enables autonomous travel (automatic travel) along a travel route R in a farm field F (see FIG. 3). For example, based on positional information on a current position of the work vehicle 10, which is calculated by a positioning system 14, the work vehicle 10 can travel autonomously along the travel route R that is generated for the farm field F in advance.

[Work Vehicle 10]

Figure 2:
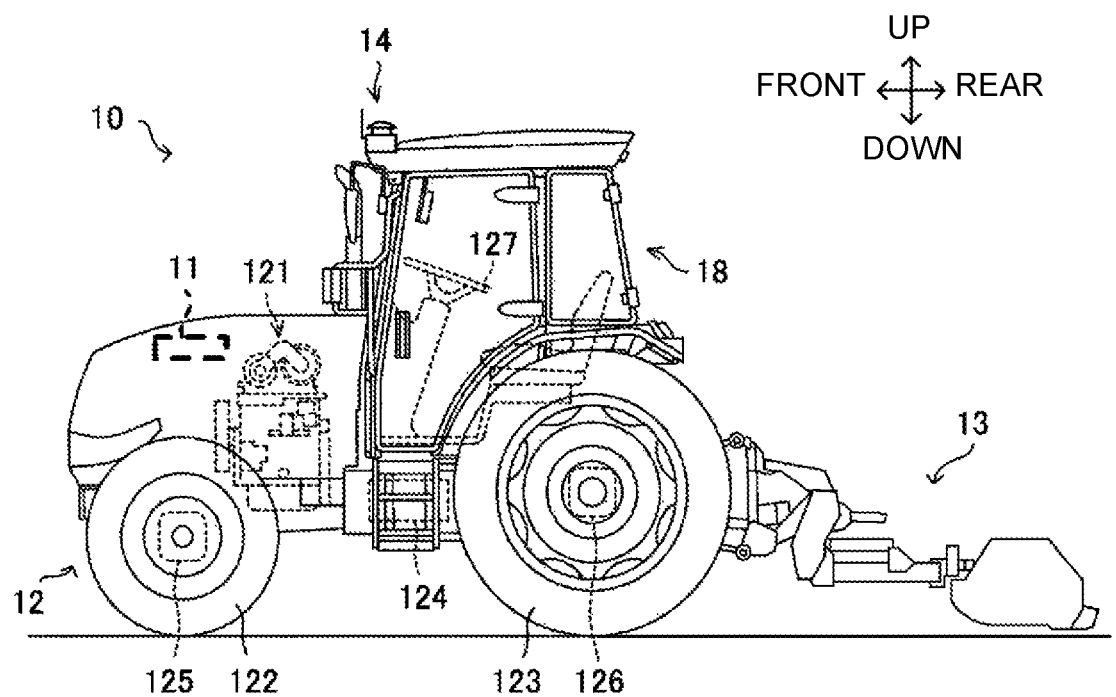
FIG. 2 is an external view illustrating an example of a work vehicle according of the first embodiment of the present invention.

As illustrated in FIG. 1 and FIG. 2, the work vehicle 10 includes a vehicle controller 11, a travel system 12, a work machine 13, the positioning system 14, and the like. The vehicle controller 11 is electrically connected to the travel system 12, the work machine 13, the positioning system 14, and the like. Here, the vehicle controller 11 and the positioning system 14 may be communicable wirelessly.

The vehicle controller 11 is a computer system that includes one or plural processors and storage memory such as non-volatile memory and RAM. The vehicle controller 11 controls operation of the work vehicle 10 in response to any of various user's operations on the work vehicle 10. In addition, the vehicle controller 11 executes autonomous travel processing of the work vehicle 10 on the basis of the current position of the work vehicle 10, which is calculated by the positioning system 14 described below, and the travel route R, which is generated in advance. The travel route R is stored in the storage memory. Alternatively, the travel route R may be stored in a storage unit 22 of the operation terminal 20.

The travel system 12 is a drive unit for driving the work vehicle 10. As illustrated in FIG. 2, the travel system 12 includes an engine 121, a front wheel 122, a rear wheel 123, a transmission 124, a front axle 125, a rear axle 126, a steering wheel 127, and the like. The front wheel 122 and the rear wheel 123 are each provided to right and left sides of the work vehicle 10. Here, the travel system 12 is not limited to that of a wheel type including the front wheels 122 and the rear wheels 123 but may be that of a crawler type including a crawler that is provided to the right and left sides of the work vehicle 10.

The engine 121 is a drive source, such as a diesel engine or a gasoline engine, that is driven by using fuel supplied to an unillustrated fuel tank. In addition to the engine 121, or instead of the engine 121, the travel system 12 may include an electric motor as the drive source. A generator, which is not illustrated, is connected to the engine 121, and electric power is supplied from the generator to electrical components such as the vehicle controller 11, a battery, and the like that are provided in the work vehicle 10. The battery stores the electric power that is supplied from the generator. The electrical components, such as the vehicle controller 11 and the positioning system 14, that are provided in the work vehicle 10 can be driven by the electric power supplied from the battery even after the engine 121 is stopped.

Drive power of the engine 121 is transmitted to the front wheels 122 via the transmission 124 and the front axle 125 and is transmitted to the rear wheels 123 via the transmission 124 and the rear axle 126. The drive power of the engine 121 is also transmitted to the work machine 13 via a PTO shaft (not illustrated). In the case where the work vehicle 10 travels autonomously, the travel system 12 performs travel operation according to a command from the vehicle controller 11.

Examples of the work machine 13 are a mower, a cultivator, a plow, a fertilizer, and a sowing machine, and the work machine 13 can be attached/detached to/from the work vehicle 10. Thus, the work vehicle 10 can perform any of various types of work by using the respective work machine 13. In the first embodiment, a description will be made on a case where the work machine 13 is the mower as an example.

In the work vehicle 10, the work machine 13 may be supported by a lift mechanism, which is not illustrated, in a manner to be able to be lifted or lowered. The vehicle controller 11 can lift/lower the work machine 13 by controlling the lift mechanism. For example, the vehicle controller 11 lowers the work machine 13 when the work vehicle 10 travels forward in a work target region of the farm field F, and lifts the work machine 13 when the work vehicle 10 travels rearward therein.

The steering wheel 127 is an operation unit that is operated by the user (an operator) or the vehicle controller 11. For example, in the travel system 12, an angle of the front wheel 122 is changed by a hydraulic power steering mechanism, which is not illustrated, in response to an operation of the steering wheel 127 by the vehicle controller 11, so as to change an advancing direction of the work vehicle 10.

In addition to the steering wheel 127, the travel system 12 includes a shift lever, an accelerator, a brake, and the like, which are not illustrated and are operated by the vehicle controller 11. Then, in the travel system 12, a gear of the transmission 124 is switched to a forward gear, a reverse gear, or the like in response to an operation of the shift lever by the vehicle controller 11, and a travel mode of the work vehicle 10 is thereby switched to forward travel, reverse travel, or the like, respectively. In addition, the vehicle controller 11 operates the accelerator to control a speed of the engine 121. Furthermore, the vehicle controller 11 operates the brake and brakes rotation of the front wheels 122 and the rear wheels 123 by using an electromagnetic brake.

The positioning system 14 is a communication system that includes a control unit 141, a storage unit 142, a communication unit 143, a positioning antenna 144, and the like. For example, as illustrated in FIG. 2, the positioning system 14 is provided on top of a cabin 18 which the operator sits in. However, an installation position of the positioning system 14 is not limited to the cabin 18. Furthermore, the control unit 141, the storage unit 142, the communication unit 143, and the positioning antenna 144 of the positioning system 14 may be dispersed at different positions in the work vehicle 10. As described above, the battery is connected to the positioning system 14, and the positioning system 14 can be operated even when the engine 121 is stopped. For example, a mobile phone terminal, a smartphone, a tablet terminal, or the like may be used in place of the positioning system 14.

The control unit 141 is a computer system that includes one or plural processors and storage memory such as non-volatile memory and RAM. The storage unit 142 is non-volatile memory that stores: a program for causing the control unit 141 to execute positioning processing; and data such as positioning information and movement information. For example, the program is recorded in a non-transitory manner in a computer-readable recording medium such as a CD or a DVD, is read by a predetermined reader (not illustrated), and is stored in the storage unit 142. However, the program may be downloaded to the positioning system 14 from a server (not illustrated) via the communication network N1 and stored in the storage unit 142.

The communication unit 143 is a communication interface that connects the positioning system 14 to the communication network N1 in a wired or wireless manner for data communication with an external device, such as a base station server, via the communication network N1 according to a predetermined communication protocol.

The positioning antenna 144 is an antenna that receives a radio wave (a GNSS signal) emitted from a satellite.

The control unit 141 calculates the position (the current position) of the work vehicle 10 on the basis of the GNSS signal that is received by the positioning antenna 144 from the satellite. For example, in the case where the positioning antenna 144 receives the radio waves (emitted time, locus information, and the like) emitted from the plural satellites when the work vehicle 10 travels autonomously in the farm field F, the control unit 141 calculates a distance between the positioning antenna 144 and each of the satellites and calculates the current position (a latitude and a longitude) of the work vehicle 10 on the basis of the calculated distances. Alternatively, the control unit 141 may adopt a real-time kinematic positioning method (an RTK-GPS positioning method, hereinafter referred to as an "RTK method") to calculate the current position of the work vehicle 10 by using correction information that corresponds to the base station (a reference station) near the work vehicle 10. Just as described, the work vehicle 10 travels autonomously by using the positioning information acquired by the RTK method.

The travel route R on which the work vehicle 10 travels is generated by the operation terminal 20, for example. The work vehicle 10 acquires data on the travel route R from the operation terminal 20, and performs the work (for example, mowing work) using the work machine 13 while traveling autonomously along the travel route R in the farm field F.

[Operation Terminal 20]

As illustrated in FIG. 1, the operation terminal 20 is an information processor that includes a control unit 21, the storage unit 22, an operation display unit 23, a communication unit 24, and the like. The operation terminal 20 may be a mobile terminal such as the tablet terminal or the smartphone.

The communication unit 24 is a communication interface that connects the operation terminal 20 to the communication network N1 in the wired or wireless manner for data communication with the external device, such as the one or plural work vehicles 10, via the communication network N1 according to the predetermined communication protocol.

The operation display unit 23 is a user interface that includes: a display unit, such as a liquid crystal display or an organic EL display, that displays various types of information; and an operation unit, such as a touch panel, a mouse, or a keyboard, that accepts an operation. On an operation screen that is displayed in the display unit, the operator (the user) can operate the operation unit to perform an operation for registering various types of information (work vehicle information, farm field information, work information, and the like, which will be described below). In addition, the operator can operate the operation unit to issue an autonomous travel instruction to the work vehicle 10. Furthermore, at a position away from the work vehicle 10, the operator can comprehend a travel status of the work vehicle 10, which travels autonomously along the travel route R in the farm field F, from the swept path that is displayed on the operation terminal 20.

The storage unit 22 is a non-volatile storage unit, such as a hard disk drive (HDD) or a solid state drive (SSD), that stores the various types of the information. The storage unit 22 stores control programs such as a travel route generation program to cause the control unit 21 to execute travel route generation processing (see FIG. 10), which will be described below. For example, the travel route generation program is recorded in the non-transitory manner in a computer-readable recording medium such as a CD or a DVD, is read by the reader (not illustrated) such as a CD drive or a DVD drive provided in the operation terminal 20, and is stored in the storage unit 22. However, the travel route generation program may be downloaded to the operation terminal 20 from the server (not illustrated) via the communication network N1 and stored in the storage unit 22. The storage unit 22 may also store the work information (a mowing amount, a harvest amount, or the like) that is sent from the work vehicle 10.

In addition, a dedicated application for the autonomous travel of the work vehicle 10 is installed in the storage unit 22. The control unit 21 activates the dedicated application, executes processing to set the various types of the information on the work vehicle 10 and processing to generate the travel route of the work vehicle 10, issues the autonomous travel instruction to the work vehicle 10, and the like.

Figure 3:
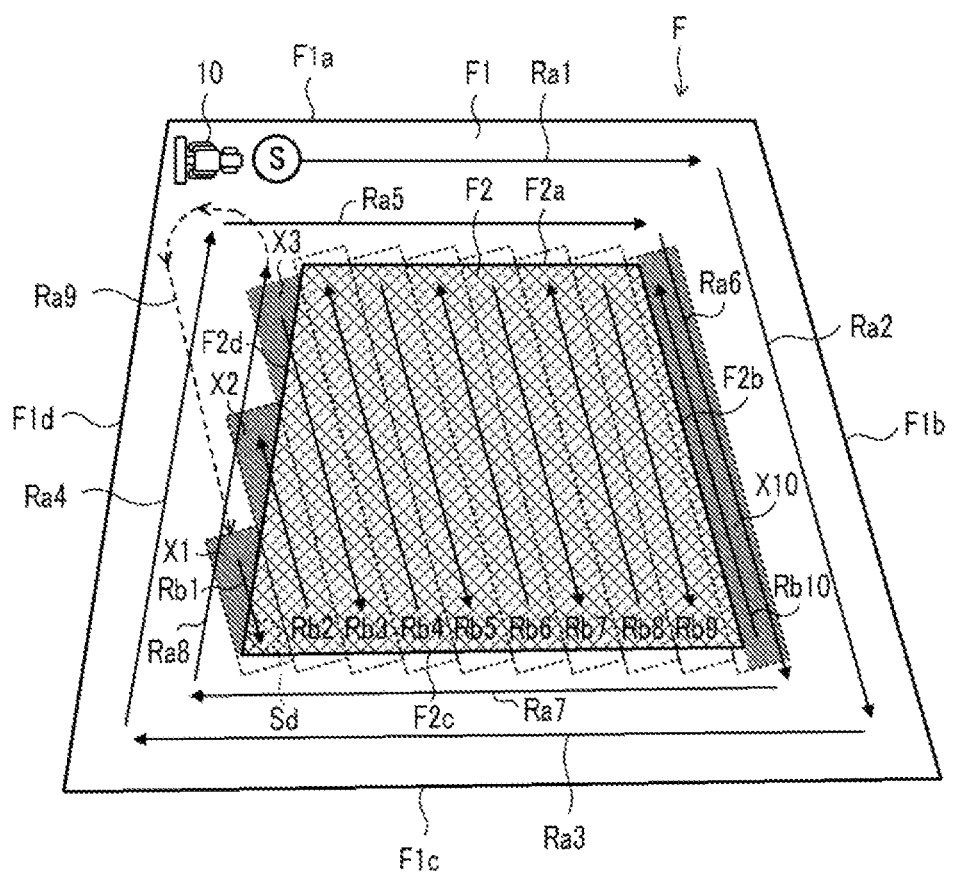
FIG. 3 is a view illustrating an example of a travel route of a conventional work vehicle.

Here, according to the related art, in the case where a shape of the farm field F to be worked is not rectangular but irregular, the following problem possibly occurs. FIG. 3 illustrates an example of the farm field F and an example of the travel route R that corresponds to the farm field F. The farm field F illustrated in FIG. 3 has a rectangular parallelepiped shape that is defined by an upper side F1a, a right side F1b, a lower side F1c, and a left side F1d, and has such a shape that the opposing upper side F1a and lower side F1c are not parallel to each other and the opposing right side F1b and left side F1d are not parallel to each other. The farm field F includes a first work region (an inner peripheral work region F2) in a central portion of the farm field F and a second work region (an outer peripheral work region F1) on an outer side of the inner peripheral work region F2. The inner peripheral work region F2 has a similar shape to the shape of the farm field F, has a rectangular parallelepiped shape that is defined by an upper side F2a, a right side F2b, a lower side F2c, and a left side F2d, and has such a shape that the opposing upper side F2a and lower side F2c are not parallel to each other and the opposing right side F2b and left side F2d are not parallel to each other. The upper side F1a of the farm field F is parallel to the upper side F2a of the inner peripheral work region F2, the right side F1b of the farm field F is parallel to the right side F2b of the inner peripheral work region F2, the lower side F1c of the farm field F is parallel to the lower side F2c of the inner peripheral work region F2, and the left side F1d of the farm field F is parallel to the left side F2d of the inner peripheral work region F2.

For example, after working on the outer peripheral work region F1 along the travel route R, the work vehicle 10 works on the inner peripheral work region F2. The travel route R includes: a travel route Ra (travel routes Ra1 to Ra8) on which the work vehicle 10 travels spirally from the outer side toward an inner side in the outer peripheral work region F1; and a travel route Rb (travel routes Rb1 to Rb10) on which the work vehicle 10 travels back and forth in parallel from one side to the opposite side in the inner peripheral work region F2. In the case where an upper left end is set as a travel start position S in FIG. 3, the travel routes Ra1 to Ra8 corresponding to the outer peripheral work region F1 are generated. Here, in the case where a work direction of the work vehicle 10 in the inner peripheral work region F2 is set to a parallel direction to the right side F1b, a work start position in the inner peripheral work region F2 is set at a position (a lower left corner Sd in FIG. 3) with the shortest distance from a work end position (a terminal end of the travel route Ra8) in the outer peripheral work region F1. In this case, a travel route Ra9 is generated to connect the work end position in the outer peripheral work region G1 to the work start position Sd. In addition, in regard to the travel route Rb in the inner peripheral work region F2, the travel routes Rb1 to Rb10, each of which is parallel to the right side F1b (the right side F2b), are generated from the work start position Sd.

The work vehicle 10 performs the work along the travel routes Ra1 to Ra8 in the outer peripheral work region F1. Then, when finishing the work in the outer peripheral work region F1, the work vehicle 10 travels (travels without performing the work) on the travel route Ra9 and enters the work start position Sd in the inner peripheral work region F2. Then, in the inner peripheral work region F2, the work vehicle 10 performs the work while traveling on the travel routes Rb1 to Rb10. When moving to the adjacent travel route Rb during the work on the inner peripheral work region F2, the work vehicle 10 changes (turns) a direction thereof in a fishtail fashion by using a switchback, for example.

When the work vehicle 10 travels on the above-described travel route R, an overlapping region where the work path (the swept path) at the time of traveling in the outer peripheral work region F1 overlaps the work path (the swept path) at the time of traveling in the inner peripheral work region F2 is generated. More specifically, as illustrated in FIG. 3, on the left side F2d, an overlapping region X1 at the time of traveling on the travel route Rb1, an overlapping region X2 at the time of traveling on the travel route Rb2, and an overlapping region X3 at the time of traveling on the travel route Rb3 are generated. On the right side F2b, an overlapping region X10 at the time of traveling on the travel route Rb10 is generated. Just as described, according to the related art, the generation of the work overlapping region by the work vehicle 10 leads to a problem of reduced work efficiency.

To handle such a problem, the autonomous travel system 1 according to the first embodiment has a configuration capable of improving the work efficiency by reducing the overlapping region. A description will hereinafter be made on a specific configuration for improving the work efficiency.

As illustrated in FIG. 1, the control unit 21 of the operation terminal 20 includes various processing sections such as a vehicle setting processing section 211, a farm field setting processing section 212, a work setting processing section 213, a work direction setting processing section 214, a work start position setting processing section 215, a route setting processing section 216, a turning setting processing section 217, a route generation processing section 218, a display processing section 219, and an output processing section 220. The control unit 21 functions as each of the various processing sections when a CPU therein executes the respective processing according to the travel route generation program. Some or all of the processing sections may each be constructed of an electronic circuit. Here, the travel route generation program may be a program that causes the plural processors to function as the processing sections.

The vehicle setting processing section 211 sets the information on the work vehicle 10 (the tractor) (hereinafter referred to as the "work vehicle information"). When the operator performs the registration operation on the operation terminal 20, the vehicle setting processing section 211 sets information on a model of the work vehicle 10, the attachment position of the positioning antenna 144 in the work vehicle 10, the type of the work machine 13, a size and a shape of the work machine 13, a position of the work machine 13 with respect to the work vehicle 10, a vehicle speed and the engine speed of the work vehicle 10 during the work, the vehicle speed and the engine speed of the work vehicle 10 during turning, and the like.

The farm field setting processing section 212 sets information on the farm field F and the work region (hereinafter referred to as the "farm field information"). When the operator performs the registration operation on the operation terminal 20, the farm field setting processing section 212 sets information on a position and the shape of the farm field F, a position and the shape of the work region, the travel start position S and the travel end position, between which the autonomous travel is desired, and the like. The farm field setting processing section 212 is an example of the work region setting processing section in the present invention.

For example, the information on the position and the shape of the farm field F can be acquired automatically, for example, when the operator gets in the work vehicle 10 and drives around the farm field F along an outer periphery thereof to record the transition of the positional information of the positioning antenna 144 at the time. Alternatively, the position and the shape of the farm field F can be acquired on the basis of a polygon that is acquired when the operator operates the operation terminal 20 and designates plural points on a map in a state where the map is displayed on the operation terminal 20.

The operator can set the positions and the shapes (see FIG. 3) of the outer peripheral work region F1 and the inner peripheral work region F2 in the farm field F by operating the operation terminal 20. The farm field setting processing section 212 sets the farm field F, the outer peripheral work region F1, and the inner peripheral work region F2 on the basis of the operator's operation. In the first embodiment, for example, as illustrated in FIG. 3 and the like, the farm field setting processing section 212 sets the inner peripheral work region F2, the shape of which corresponds to the shape of the farm field F and which is the central portion of the farm field F, and the outer peripheral work region F1 on the outer side of the inner peripheral work region F2 in regard to the farm field F that is the work target of the work vehicle 10 and has the shape (a non-rectangular shape) in which at least one pair of the opposing sides of the plural sides defining the farm field F is not parallel. Each of the set farm field F, the set outer peripheral work region F1, and the set inner peripheral work region F2 is a region (a travel region) where the work vehicle 10 can travel.

The work setting processing section 213 sets information on how to specifically perform the work (hereinafter referred to as the "work information"). The work setting processing section 213 is configured to be able to set, as the work information, presence or absence of collaborative work between the work vehicle 10 (the unmanned tractor) and the manned work vehicle 10, the number of skips, which is the number of the work routes to be skipped when the work vehicle 10 turns in a headland, a width of the headland, a width of non-cultivated land, and the like.

The work direction setting processing section 214 sets the work direction of the work vehicle 10 in the inner peripheral work region F2. The work direction means a direction in which the work vehicle 10 travels while performing the work by using the work machine 13 in the work region that is the farm field F excluding non-working regions such as the headland and the non-cultivated land. For example, in the case where the operator sets the work direction of the work vehicle 10 in the inner peripheral work region F2 to the parallel direction to the right side F1b, the work direction setting processing section 214 sets the work direction of the work vehicle 10 to the parallel direction to the right side F1b (the right side F2b). The work direction setting processing section 214 is an example of the work direction setting processing section in the present invention.

The work start position setting processing section 215 sets the work start position of the work vehicle 10 in the inner peripheral work region F2. More specifically, the work start position setting processing section 215 sets any of the plural corners of the inner peripheral work region F2 to the work start position. For example, in the case where the operator registers the work direction of the work vehicle 10 in the inner peripheral work region F2 to the parallel direction to the right side F1b, the work start position setting processing section 215 sets, as the work start position, the corner at which such a positional relationship is established that the first travel route Rb1 (a work start route) in the inner peripheral work region F2 is adjacent to the side defining the inner peripheral work region F2. The travel route Rb1 (the work start path) is an example of the first travel route in the present invention.

Figure 4:
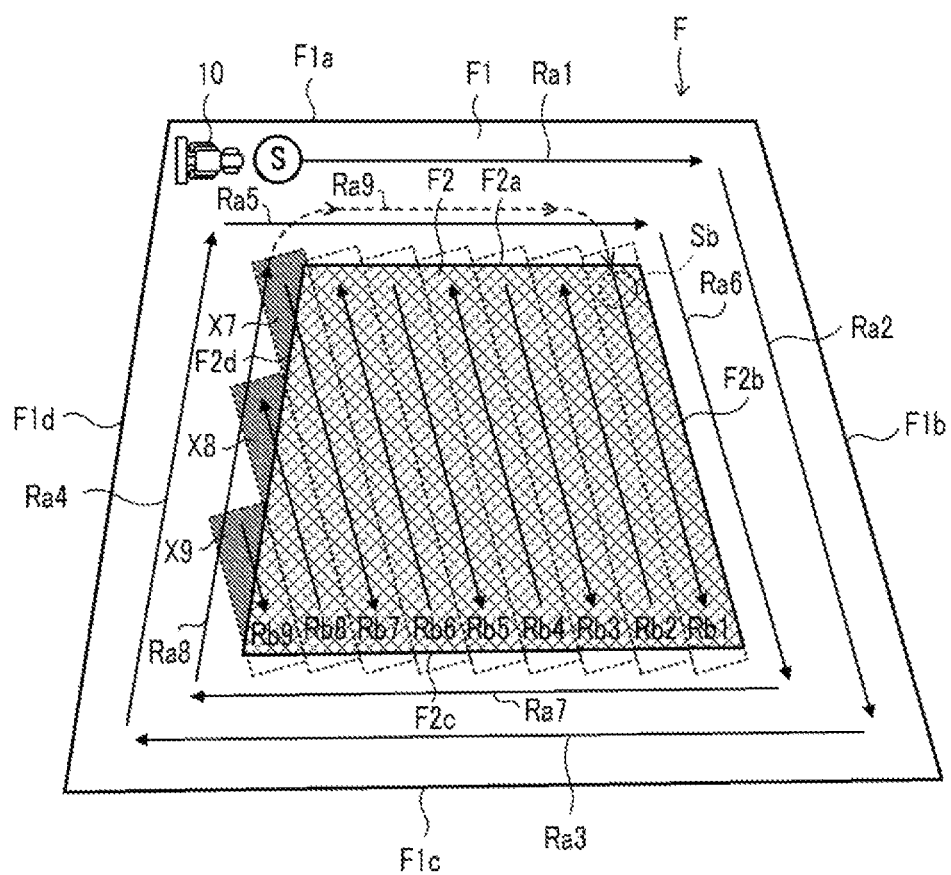
FIG. 4 is a view illustrating an example of a travel route of the work vehicle according to the first embodiment of the present invention.

Here, for example, as illustrated in FIG. 4, the work start position setting processing section 215 sets, as the work start position, a corner Sb at an upper right end at which such a positional relationship is established that the travel route Rb1 is adjacent to the right side F2b defining the inner peripheral work region F2. Alternatively, the work start position setting processing section 215 may set, as the work start position, a corner Sc (see FIG. 8) at a lower right end at which such a positional relationship is established that the travel route Rb1 is adjacent to the right side F2b defining the inner peripheral work region F2. Here, the work start position setting processing section 215 may set, as the work start position, the corner Sb, a moving distance (a distance of the travel route Ra9 without the work) to which from the work end position (the terminal end of the travel route Ra8) in the outer peripheral work region F1 is the shortest of the corners Sb, Sc. That is, the work start position setting processing section 215 sets, as the work start position, the position which has the shortest distance from the work end position (the terminal end of the travel route Ra8) in the outer peripheral work region F1 and at which the travel route Rb1 can be set. The work start position setting processing section 215 is an example of the work start position setting processing section in the present invention.

The route setting processing section 216 sets the travel route Rb1 (the work start route), on which the work vehicle 10 first travels from the work start position in the inner peripheral work region F2, at the adjacent position to the side, which is parallel to the work direction, of the plural sides F2a to F2d defining the inner peripheral work region F2. In addition, the route setting processing section 216 sets the travel route Rb1 (the work start route) on the basis of the work start position that is set by the work start position setting processing section 215. For example, in the case where the work direction of the work vehicle 10 in the inner peripheral work region F2 is set to the parallel direction to the right side F1*b*, as illustrated in FIG. 4, the work start position setting processing section 215 sets the corner Sb as the work start position, and the route setting processing section 216 sets the travel route Rb1 (the work start route) at the adjacent position to the side F2*b*, which is parallel to the right side F1*b*, of the plural sides F2*a* to F2*d* defining the inner peripheral work region F2. The route setting processing section 216 is an example of the route setting processing section in the present invention.

The turning setting processing section 217 sets a turning route of the work vehicle 10. In the first embodiment, in the case where the work vehicle 10 works on the inner peripheral work region F2, the work vehicle 10 turns when sequentially traveling back and forth on the travel routes Rb1 to Rb9. The operator can operate the operation terminal 20 to select the turning route of the work vehicle 10. The turning setting processing section 217 sets the turning route of the work vehicle 10 on the basis of the operator's operation. For example, the operator can select a switchback turn that makes the work vehicle 10 change the direction in a fishtail direction for the travel, a U-turn that makes the work vehicle 10 change the direction in a U-shape for the travel, or the like. In addition, the turning setting processing section 217 can set and change a turning radius and a turning angle. The turning setting processing section 217 is an example of the turning setting processing section in the present invention.

Here, the turning setting processing section 217 may set the same turning route in all direction change portions, or may set such a turning route that a turning method (the turning angle, a length of the turning route, and the like) differs in the predetermined travel route Rb. For example, the turning setting processing section 217 may make the turning method for the turning route of the travel route Rb8 differ from the turning method for the turning routes of the other travel routes Rb. The travel route Rb intersects with the side F2*d* that opposes the side F2*b* parallel to the travel route Rb1 as the work start route in the inner peripheral work region F2. A description on the autonomous travel system 1 that adopts such different turning routes will be made on a second embodiment below.

Based on the setting information, the route generation processing section 218 generates the travel route R as the route on which the work vehicle 10 travels autonomously. The travel route R includes: the travel route Ra on which the work vehicle 10 travels in the outer peripheral work region F1 from the travel start position S; and the travel route Rb on which the work vehicle 10 travels in the inner peripheral work region F2 from the work start position (see FIG. 4). For example, the travel route R is a travel route on which the work vehicle 10 travels from the outer peripheral work region F1 to the inner peripheral work region F2. The route generation processing section 218 can generate and store the travel route R of the work vehicle 10 on the basis of the setting information that is set by each of the vehicle setting processing section 211, the farm field setting processing section 212, the work setting processing section 213, the work direction setting processing section 214, the work start position setting processing section 215, the route setting processing section 216, and the turning setting processing section 217. The route generation processing section 218 is an example of the route generation processing section in the present invention.

More specifically, the route generation processing section 218 generates the travel route R (see FIG. 4) on the basis of the travel start position S, the work start position, the travel end position, and the work region (the outer peripheral work region F1 and the inner peripheral work region F2) that are registered by the farm field setting. For example, the route generation processing section 218 generates the travel routes Ra1 to Ra8 in the outer peripheral work region F1 on the basis of the travel start position S. In addition, the route generation processing section 218 generates the travel route Ra9 from the work end position (the terminal end of the travel route Ra8) in the outer peripheral work region F1 to the work start position Sb. The travel route Ra9 illustrated in FIG. 4 indicates a route (a route without the work) on which the work vehicle 10 travels with the work machine 13 being lifted.

Furthermore, the route generation processing section 218 generates the travel route Rb of the work vehicle 10 in the inner peripheral work region F2 on the basis of the work direction, which is set by the work direction setting processing section 214, and the travel route Rb1 (the work start route), which is set by the route setting processing section 216. For example, as illustrated in FIG. 4, the route generation processing section 218 generates the travel route Rb in the inner peripheral work region F2. The travel route Rb includes the travel route Rb1, which starts from the work start position Sb and is parallel and adjacent to the side F2*b*, and the travel routes Rb2 to Rb9 following the travel route Rb1. A terminal end position of the travel route Rb9 is set as the travel end position in the farm field F.

The display processing section 219 causes the operation display unit 23 to display the various types of the information. More specifically, the display processing section 219 causes the operation display unit 23 to display setting screens for setting the work vehicle 10, the farm field F, the outer peripheral work region F1, the inner peripheral work region F2, a work content, the travel start position S, the travel end position, and the like. In addition, the display processing section 219 causes the operation display unit 23 to display the travel route R, which is generated by the route generation processing section 218 (see FIG. 4).

The output processing section 220 outputs the information on the travel route R, which is generated by the route generation processing section 218, to the work vehicle 10. In addition, the output processing section 220 can instruct the work vehicle 10 to initiate or stop the autonomous travel, or the like by sending a control signal to the work vehicle 10 via the communication unit 24. In this way, the work vehicle 10 can travel autonomously.

The work vehicle 10 is configured that the data on the travel route R generated on the operation terminal 20 is transferred to the work vehicle 10 and stored in the storage memory of the vehicle controller 11 and that the work vehicle 10 can travel autonomously along the travel route R while the current position of the work vehicle 10 is detected by the positioning antenna 144. For example, in the case where the current position of the work vehicle 10 matches the travel start position S, the operator presses a work start button on the operation screen to issue an instruction of the "work start", and then the work vehicle 10 starts traveling autonomously. The vehicle controller 11 causes the work vehicle 10 to travel autonomously from the travel start position S to the travel end position on the basis of the travel route R that is acquired from the operation terminal 20. In addition, when the work vehicle 10 finishes the work, the vehicle controller 11 may cause the work vehicle 10 to travel autonomously from the travel end position to an entrance of the farm field F. In this case, the vehicle controller 11 desirably causes the work vehicle 10 to travel autonomously from the travel end position to the entrance via the travel route without causing the work vehicle 10 to travel on the shortest route from the travel end position to the entrance. In this way, it is possible to prevent the swept path (tire tracks) of the work vehicle 10 from being left in the farm field F after the end of the work.

Here, in the case where the work vehicle 10 travels autonomously, the control unit 21 can receive the status (the position, a travel speed, and the like) of the work vehicle 10 from the work vehicle 10 and display the status of the work vehicle 10 on the operation display unit 23.

Here, the operation terminal 20 may be accessible to a Web site (an agricultural support site) of an agricultural support service provided by the service (not illustrated) via the communication network N1. In this case, a browser program is executed by the control unit 21, and the operation terminal 20 can thereby function as an operation terminal for the server. Then, the server includes each of the above-described processing sections to execute each type of the processing.

According to the above-described embodiment, as illustrated in FIG. 4, only regions X7, X8, X9 are the overlapping regions. Thus, compared to the overlapping regions generated by the travel route R illustrated in FIG. 3, the overlapping region X10 can be eliminated. Therefore, it is possible to improve the work efficiency of the work vehicle 10.

In the above-described embodiment, the control unit 21 generates the travel route R on the basis of the work direction of the work vehicle 10 that is registered by the operator. As another embodiment, the control unit 21 may set the work direction on the basis of a predetermined condition and generates the travel route R on the basis of the work direction. A description will hereinafter be made on a specific configuration in the case where the work direction of the work vehicle 10 in the inner peripheral work region F2 is not registered by the operator.

The work start position setting processing section 215 sets the corner, which is selected on the basis of a predetermined condition, of the plural corners included in the inner peripheral work region F2 as the work start position. For example, as illustrated in FIG. 5, the work start position setting processing section 215 sets a corner Sa, which is the closest to the work end position in the outer peripheral work region F1 of the plural corners included in the inner peripheral work region F2, as the work start position.

The work direction setting processing section 214 sets the work direction on the basis of the work start position (the corner Sa) that is set by the work start position setting processing section 215. For example, the work direction setting processing section 214 sets, as the work direction, a parallel direction to the side, which is close to the work start position, of the sides of the inner peripheral work region F2. Here, the work direction setting processing section 214 sets a parallel direction to the left side F2b as the work direction.

Figure 5:
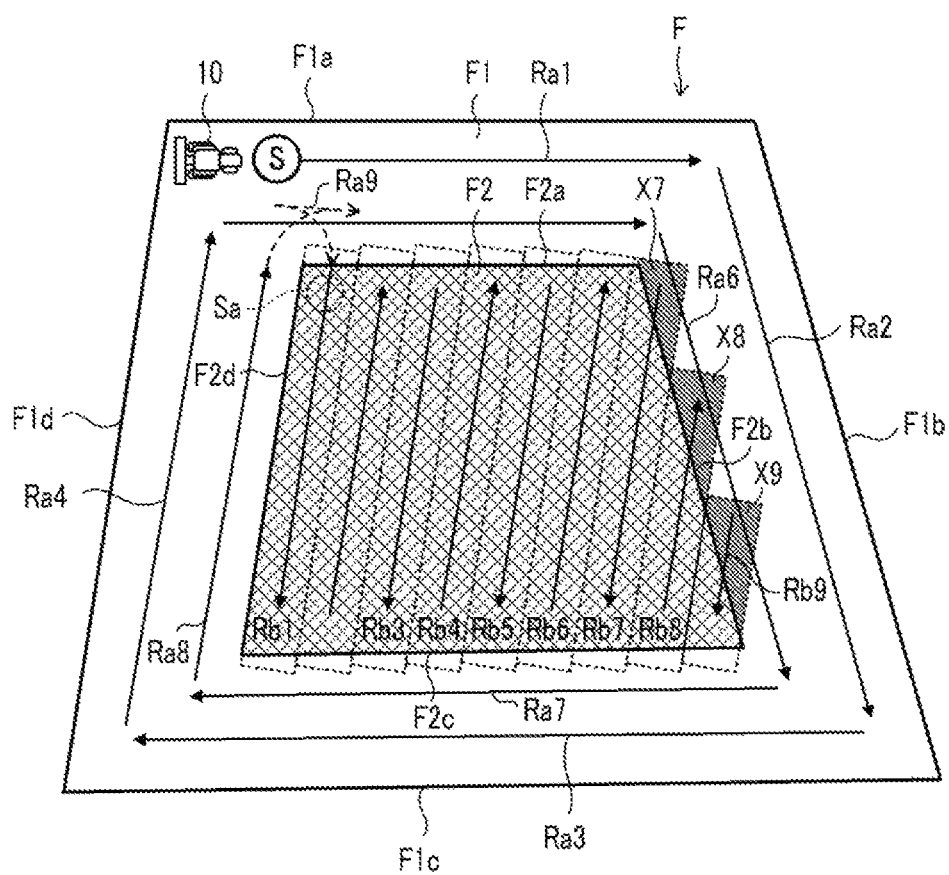
FIG. 5 is a view illustrating an example of the travel route of the work vehicle according to the first embodiment of the present invention.

The route setting processing section 216 sets the travel route Rb1 (the work start route) at an adjacent position to the left side F2b that is parallel to the work direction (see FIG. 5). More specifically, the route setting processing section 216 sets the travel route Rb1 (the work start route) at an adjacent position to the side (the left side F2d herein), which is parallel to the work direction and the closest to the work end position in the outer peripheral work region F1 of the plural sides defining the inner peripheral work region F2. The route generation processing section 218 generates the travel routes Rb1 to Rb9 of the work vehicle 10 in the inner peripheral work region F2 on the basis of the set work direction and the set travel route Rb1 (the work start route).

According to the travel route R illustrated in FIG. 5, only the regions X7, X8, X9 are the overlapping regions. Thus, compared to the overlapping regions generated by the travel route R illustrated in FIG. 3, the overlapping region can be reduced. Therefore, it is possible to improve the work efficiency of the work vehicle 10.

Figure 6:
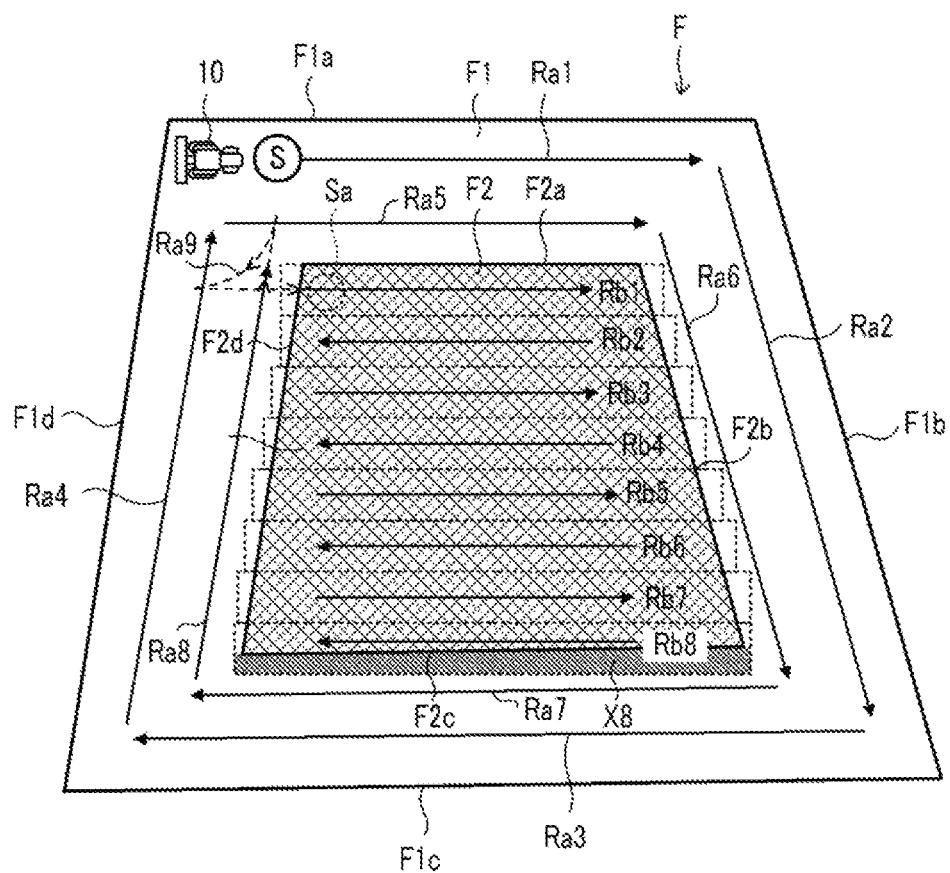
FIG. 6 is a view illustrating an example of the travel route of the work vehicle according to the first embodiment of the present invention.

In addition, in the case where the work start position setting processing section 215 sets the work start position (the corner Sa), the work direction setting processing section 214 may set, as the work direction, a parallel direction to the upper side F2a, which is close to the work start position, of the sides of the inner peripheral work region F2 (see FIG. 6). In this case, the route setting processing section 216 sets the travel route Rb1 (the work start route) at an adjacent position to the upper side F2a that is parallel to the work direction (see FIG. 6). The route generation processing section 218 generates the travel routes Rb1 to Rb8 of the work vehicle 10 in the inner peripheral work region F2 on the basis of the set work direction and the set travel route Rb1 (the work start route). According to the travel route R illustrated in FIG. 6, only the region X8 is the overlapping region. Thus, compared to the overlapping regions generated by the travel route R illustrated in FIG. 3, the overlapping region can be reduced. Therefore, it is possible to improve the work efficiency of the work vehicle 10.

Figure 7:
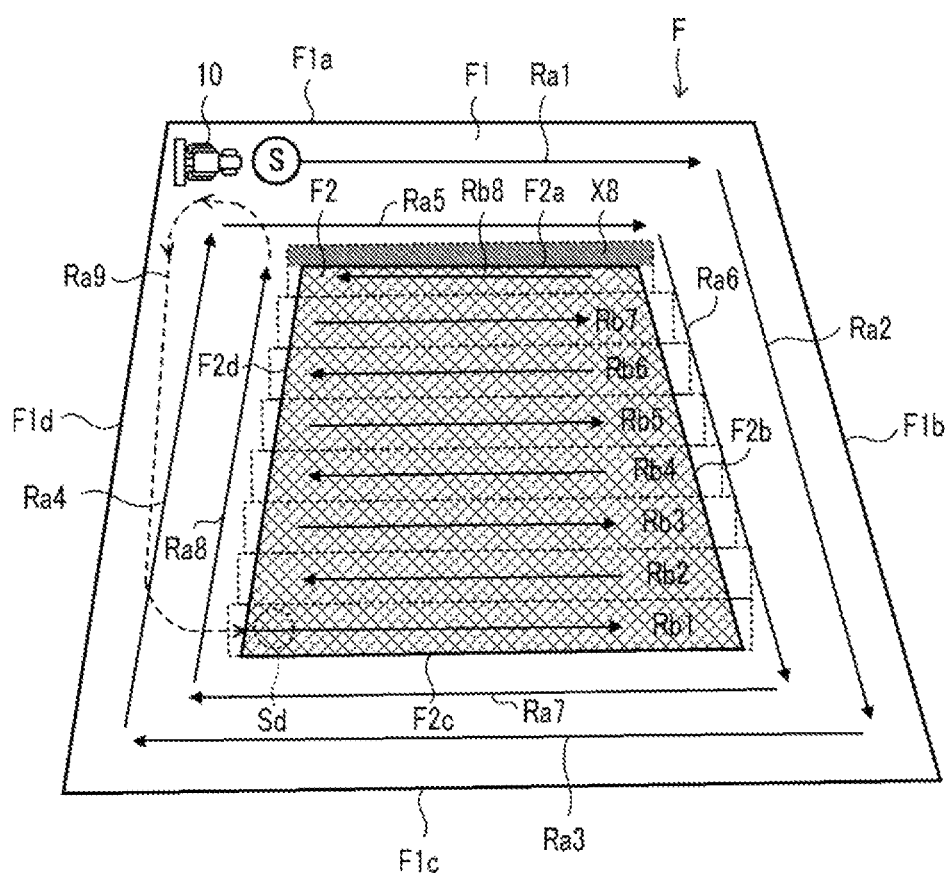
FIG. 7 is a view illustrating an example of the travel route of the work vehicle according to the first embodiment of the present invention.

In addition, for example, as illustrated in FIG. 7, the work start position setting processing section 215 may set, as the work start position, the lower left corner Sd of the plural corners included in the inner peripheral work region F2. In this case, the work direction setting processing section 214 may set, as the work direction, a parallel direction to the lower side F2c, which is close to the work start position (the corner Sd), of the sides of the inner peripheral work region F2. The route setting processing section 216 sets the travel route Rb1 (the work start route) at an adjacent position to the lower side F2c that is parallel to the work direction. The route generation processing section 218 generates the travel routes Rb1 to Rb8 of the work vehicle 10 in the inner peripheral work region F2 on the basis of the set work direction and the set travel route Rb1 (the work start route). According to the travel route R illustrated in FIG. 7, only the region X8 is the overlapping region. Thus, compared to the overlapping regions generated by the travel route R illustrated in FIG. 3, the overlapping region can be reduced. Therefore, it is possible to improve the work efficiency of the work vehicle 10.

Here, when the travel route R illustrated in FIG. 6 is compared to the travel route R illustrated in FIG. 7, the overlapping region generated by the travel route R illustrated in FIG. 7 is smaller than the overlapping region generated by the travel route R illustrated in FIG. 6. Thus, in the case where lengths of the opposing sides differ from each other, as illustrated in FIG. 7, the control unit 21 (the route setting processing section 216) desirably sets the travel route Rb1 (the work start route) at an adjacent position to the longer side (the lower side F2c herein). More specifically, the route setting processing section 216 sets the work start route at an adjacent position to the side, which is parallel to the work direction and is the longest of the plural sides defining the inner peripheral work region F2. In this way, the overlapping region can further be reduced. Therefore, it is possible to further improve the work efficiency of the work vehicle 10.

Figures 8, 9:
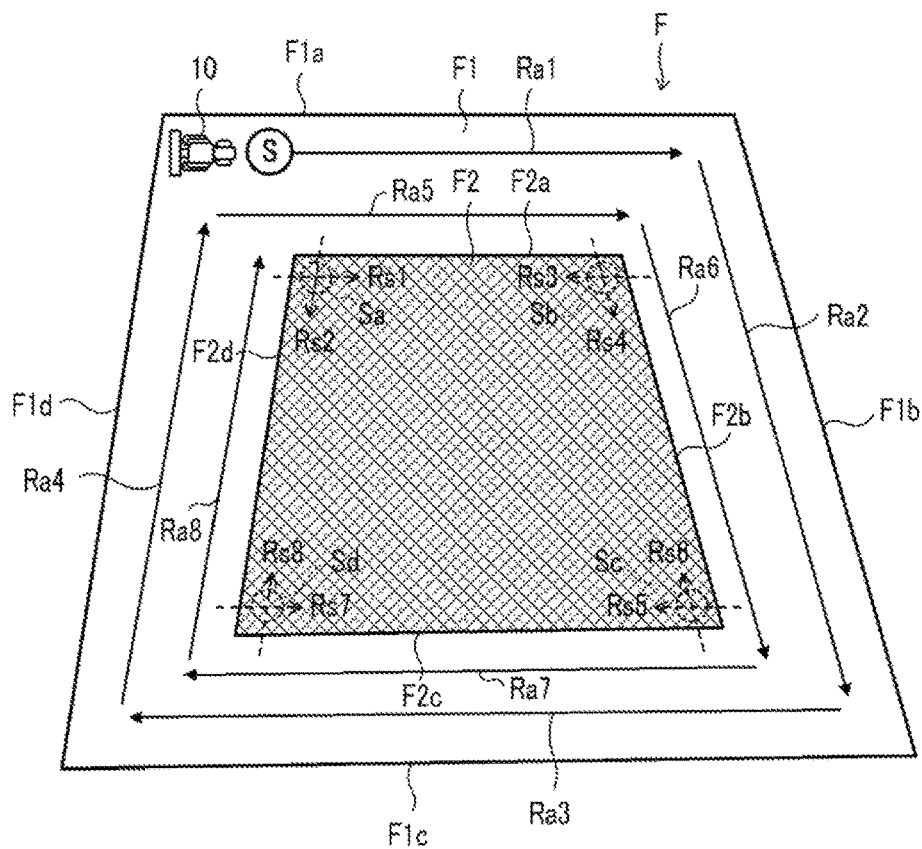
FIG. 8 is a view for explaining a setting method for the travel route of the work vehicle according to the first embodiment of the present invention.
FIG. 9 is a view illustrating an example of route setting information that is used to set the travel route of the work vehicle according to the first embodiment of the present invention.

As described above, the work start position in the inner peripheral work region F2 is not limited. Thus, for example, as illustrated in FIG. 8, the work start position may be set at any of the four corners Sa, Sb, Sc, Sd of the inner peripheral work region F2. Here, FIG. 9 illustrates route setting information D1 that indicates relationships among the work start position, the work start route, a required work time, and an overlapping work area. The control unit 21 may generate the travel route Rb in the inner peripheral work region F2 on the basis of the route setting information D1.

More specifically, the route setting processing section 216 calculates the required work time on the farm field F in the case where it is assumed that, for each of the sides defining the inner peripheral work region F2, the work start route is set at the adjacent position to the side that is parallel to the respective side. Then, the route setting processing section 216 sets the work start route at the adjacent position to the side, with which the required work time is the shortest, of the plural sides defining the inner peripheral work region F2. In addition, the route setting processing section 216 calculates a size of the overlapping region between the work path in the inner peripheral work region F2 and the work path in the outer peripheral work region F1 in the case where it is assumed that, for each of the sides defining the inner peripheral work region F2, the work start route is set at the adjacent position to the side that is parallel to the respective side. Then, the route setting processing section 216 sets the work start route at the adjacent position to the side, with which the overlapping region is the smallest, of the plural sides defining the inner peripheral work region F2.

For example, the control unit 21 calculates the required work time and the overlapping work area by simulation in the case where the work start position is set at the corner Sa and the work start route is set to a travel route Rs1 (see FIG. 8). Then, the control unit 21 registers a calculated required work time Ts1 and a calculated overlapping work area Ms1 in the route setting information D1. Similarly, the control unit 21 registers the required work time Ts1 and the overlapping work area Ms1, which correspond to each of the work start positions and each of the work start routes, in the route setting information D1.

The work start position setting processing section 215 sets the optimal work start position with reference to the route setting information D1. For example, the work start position setting processing section 215 selects and sets the work start position, with which the required work time is the shortest, of the work start positions (the corners) registered in the route setting information D1. Alternatively, the work start position setting processing section 215 may select and set the work start position, with which the overlapping work area is the smallest, of the work start positions registered in the route setting information D1. Here, the work start position setting processing section 215 may set the work start position in consideration of both of the required work time and the overlapping work area.

The route setting processing section 216 sets the optimal work start route with reference to the route setting information D1. More specifically, the route setting processing section 216 selects and sets the work start route, with which the required work time is the shortest, of the work start routes registered in the route setting information D1. Alternatively, the route setting processing section 216 may select and set the work start route, with which the overlapping work area is the smallest, of the work start routes registered in the route setting information D1. Here, the route setting processing section 216 may set the work start route in consideration of both of the required work time and the overlapping work area.

The route generation processing section 218 generates the travel route Rb of the work vehicle 10 in the inner peripheral work region F2 on the basis of the set work start position and the set work start route. With this configuration, it is possible to reduce the overlapping region by reducing the required work time. Therefore, it is possible to improve the work efficiency of the work vehicle 10.

[Travel Route Generation Processing]

Figure 10:
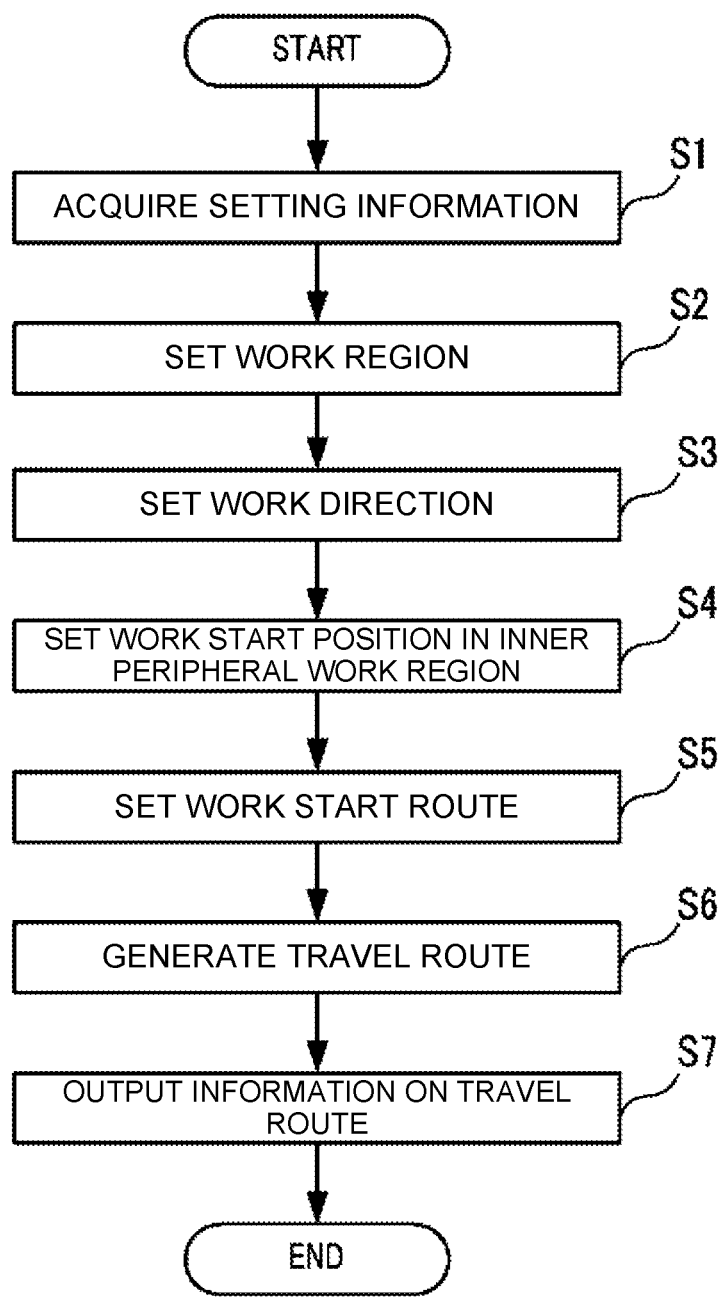
FIG. 10 is a flowchart illustrating an example of a procedure for travel route generation processing that is executed by the autonomous travel system according to the embodiment of the present invention.

A description will hereinafter be made on an example of the travel route generation processing that is executed by the control unit 21 of the operation terminal 20 with reference to FIG. 10. For example, the travel route generation processing is initiated by the control unit 21 when the control unit 21 accepts an instruction to generate the travel route R of the work vehicle 10 from the operator.

The invention of the present application may be comprehended as the invention of the travel route generation method (an example of the autonomous travel method in the present invention) in which the control unit 21 partially or entirely executes the travel route generation processing or the invention of the travel route generation program (an example of the autonomous travel program in the present invention) for causing the control unit 21 to partially or entirely execute the travel route generation method. One or plural processors may execute the travel route generation processing.

In step S1, the control unit 21 sets the various types of the setting information for generating the travel route R. More specifically, the control unit 21 acquires the work vehicle information, the farm field information, and the work information that are set by the operator.

Next, in step S2, the control unit 21 sets the work region. More specifically, the control unit 21 sets the farm field F, the outer peripheral work region F1, and the inner peripheral work region F2 on the basis of each type of the setting information. In step S2, the control unit 21 also sets the travel start position S and the travel end position. Step S2 is an example of the work region setting step.

Next, in step S3, the control unit 21 sets the work direction of the work vehicle 10 in the inner peripheral work region F2. For example, in the case where the operator sets the work direction of the work vehicle 10 in the inner peripheral work region F2 to the parallel direction to the right side F1b, the control unit 21 sets the work direction of the work vehicle 10 to the parallel direction to the right side F1b. The control unit 21 may set the work direction on the basis of the above-described predetermined condition. Step S3 is an example of the work direction setting step.

Next, in step S4, the control unit 21 sets the work start position of the work vehicle 10 in the inner peripheral work region F2. More specifically, the control unit 21 sets any of the plural corners of the inner peripheral work region F2 to the work start position. For example, in the case where the operator registers the work direction of the work vehicle 10 in the inner peripheral work region F2 to the parallel direction to the right side F1b, the control unit 21 sets, as the work start position, the corner at which such a positional relationship is established that the first travel route Rb1 (the work start route) in the inner peripheral work region F2 is adjacent to the side defining the inner peripheral work region F2. For example, as illustrated in FIG. 4, the control unit 21 sets, as the work start position, the corner Sb at the upper right end at which such a positional relationship is established that the travel route Rb1 is adjacent to the right side F2b defining the inner peripheral work region F2.

Next, in step S5, the control unit 21 sets the travel route Rb1 (the work start route) at the adjacent position to the side, which is parallel to the work direction, of the plural sides F2a to F2d defining the inner peripheral work region F2. For example, in the case where the work direction of the work vehicle 10 in the inner peripheral work region F2 is set to the parallel direction to the right side F1*b*, as illustrated in FIG. 4, the control unit 21 sets the corner Sb as the work start position, and sets the travel route Rb1 (the work start route) at the adjacent position to the side F2*b*, which is parallel to the right side F1*b*, of the plural sides F2*a* to F2*d* defining the inner peripheral work region F2. Step S5 is an example of the route setting step in the present invention.

Next, in step S6, the control unit 21 generates the travel route R, which is the route on which the work vehicle 10 travels autonomously, on the basis of the setting information. For example, based on the travel start position S, the control unit 21 generates the travel routes Ra1 to Rab in the outer peripheral work region F1 and generates the travel route Ra9 from the work end position (the terminal end of the travel route Ra) in the outer peripheral work region F1 to the work start position Sb. In addition, the control unit 21 generates the travel route Rb of the work vehicle 10 in the inner peripheral work region F2 on the basis of the work direction and the work start route (the travel route Rb1). For example, as illustrated in FIG. 4, the control unit 21 generates the travel route Rb in the inner peripheral work region F2. The travel route Rb includes the travel route Rb1, which starts from the work start position Sb and is parallel and adjacent to the side F2*b*, and the travel routes Rb2 to Rb9 following the travel route Rb1. Step S6 is an example of the route generation step in the present invention.

Next, in step S7, the control unit 21 stores the information on the travel route R in the storage unit 22 and outputs the information on the travel route R to the work vehicle 10. The work vehicle 10 travels autonomously on the basis of the information on the travel route R.

As it has been described so far, the autonomous travel system 1 according to this embodiment sets the inner peripheral work region F2 (the first work region), which is the central portion of the farm field F and corresponds to the shape of the farm field F, and the outer peripheral work region F1 (the second work region), which is positioned on the outer side of the inner peripheral work region F2, in the farm field F, which is the work target of the work vehicle 10 and has such a shape (an irregular shape) that at least one pair of the opposing sides of the plural sides defining the farm field F is not parallel. In addition, the autonomous travel system 1 sets the work direction of the work vehicle 10 in the inner peripheral work region F2, and sets the work start route (the first travel route), on which the work vehicle 10 first travels from the work start position in the inner peripheral work region F2, at the adjacent position to the side, which is parallel to the work direction, of the plural sides defining the inner peripheral work region F2. Furthermore, the autonomous travel system 1 generates the travel route Rb of the work vehicle 10 in the inner peripheral work region F2 on the basis of the work direction and the work start route.

In this way, as illustrated in FIG. 4, since the work start route (the travel route Rb1) is set along the side defining the inner peripheral work region F2, it is possible to prevent the generation of the overlapping region on the side. That is, in the example illustrated in FIG. 4, only the regions X7, X8, X9 on the opposite side of the side on the work start route side are the overlapping regions. Thus, compared to the overlapping regions generated by the travel route R illustrated in FIG. 3, the overlapping region X10 can be eliminated. Therefore, it is possible to improve the work efficiency of the work vehicle 10.

Here, as the work vehicle 10, the following work vehicle is available. The work machine 13 is attached to the work vehicle 10 in a manner to be offset to one of right and left sides of the work vehicle 10, and thus the work machine 13 can perform the predetermined work during the travel of the work vehicle 10. For example, the tractor (the work vehicle 10) performs the mowing work or the like when the work machine 13 of a direct mount type is attached to the tractor in the manner to be offset to one of the right and left sides thereof, and then the tractor travels in the farm field. Here, the work machine 13 is not limited to the work machine of the direct mount type (see FIG. 2) that is fixed to the work vehicle 10, and may be the work machine of a towed type that is towed by the work vehicle 10. In regard to such a work vehicle 10, the work start position in the inner peripheral work region F2 is limited For example, in the case where the work machine 13 is attached to the work vehicle 10 in the manner to be offset to the right side thereof and where the work direction is set to the parallel direction to the right side F1*b*, the work start position is set such that the inner peripheral work region F2 is located on the right side in the advancing direction of the work vehicle 10. In the example illustrated in FIG. 8, the work start position setting processing section 215 sets, as the work start position, the corner Sd at the lower left end or the corner Sb at the upper right end. Just as described, the work start position setting processing section 215 may set the work start position on the basis of the offset direction of the work machine 13.

Second Embodiment

The autonomous travel system according to the present invention may have a configuration in a second embodiment in addition to the configuration in the first embodiment. In regard to the autonomous travel system 1 according to the second embodiment, the same configuration as that of the autonomous travel system 1 according to the first embodiment will not be described. In addition, in the first embodiment, the description has been made on the work vehicle 10 that performs the mowing work. However, in the second embodiment, a description will be made on the work vehicle 10 that performs cultivation work. The shapes of the farm field F, the outer peripheral work region F1, and the inner peripheral work region F2 are the same as those in the first embodiment.

Figure 11:
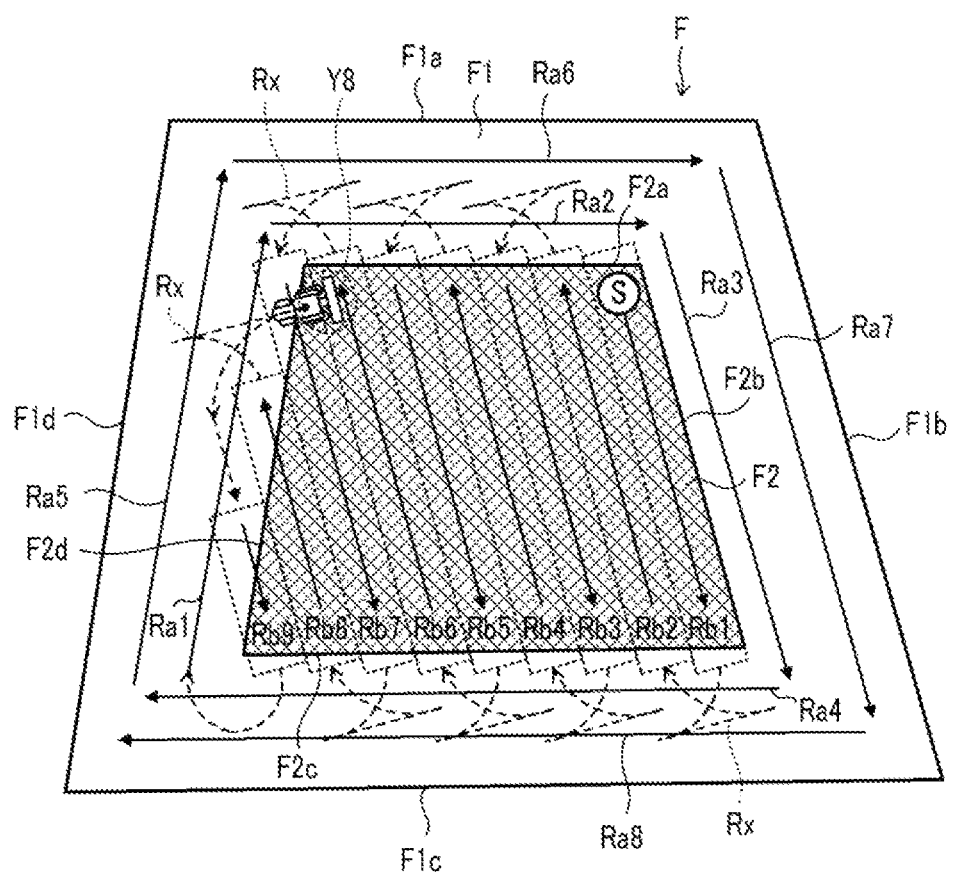
FIG. 11 is a view illustrating an example of a travel route of a work vehicle according to a second embodiment of the present invention.

FIG. 11 illustrates an example of the travel route R corresponding to the work vehicle 10 that performs the cultivation work. As illustrated in FIG. 11, the farm field F includes: the inner peripheral work region F2 where the work vehicle 10 travels back and forth to perform the cultivation work; and the outer peripheral work region F1 where the work vehicle 10 travels around on the outer side of the inner peripheral work region F2 to perform the cultivation work. When entering the farm field F from the entrance, the work vehicle 10 starts the autonomous travel at the travel start position S. Then, after traveling on the travel routes Rb1 to Rb9 to perform the work, the work vehicle 10 travels on the travel routes Ra1 to Ra8 to perform the work. The terminal end of the travel route Ra8 is set as the travel end position.

Here, as illustrated in FIG. 11, there is a case where the work vehicle 10 enters a region where the cultivation work has already been completed (an already cultivated region Y8) at the time when the work vehicle 10 travels on a turning route Rx from the travel route Rb8 and changes the direction (makes a turn) to the travel route Rb9. When the work vehicle 10 enters the already cultivated region Y8, such a problem arises that the farm field F is trampled. In addition, when it is attempted to avoid the entry into the already cultivated region Y8, the travel route of the work vehicle 10 is extended, which causes a problem of the reduced work efficiency.

To handle such a problem, the autonomous travel system 1 according to the second embodiment has the configuration capable of avoiding entry into the already cultivated region and improving the work efficiency. A description will hereinafter be made on a specific configuration.

More specifically, in the plural sides defining the inner peripheral work region F2, the turning setting processing section 217 sets a first turning route for the travel route Rb, which crosses a first side opposing the adjacent side to the work start route (the travel route Rb1), and sets a second turning route, a turning method for which differs from that for the first turning route, for the travel route Rb, which crosses the sides other than the first side. For example, as illustrated in FIG. 12, the turning setting processing section 217 sets a turning route Ry for the travel routes Rb7 to Rb9, each of which crosses the left side F2b that opposes the right side F2b adjacent to the work start route (the travel route Rb1), and sets a turning route Rx for the travel routes Rb1 to Rb6, each of which crosses the upper side F2a and the lower side F2c other than the left side F2d.

Figure 15A:
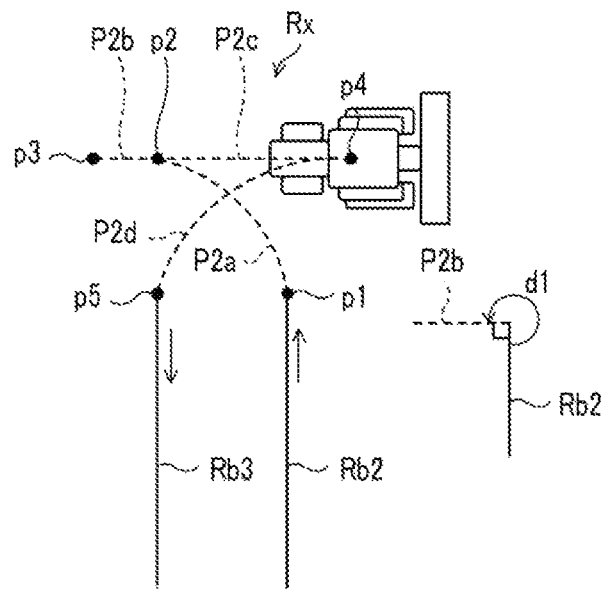
FIG. 15A is a view illustrating an example of a turning route of the work vehicle according to the second embodiment of the present invention.

Here, as illustrated in FIG. 15A, the turning route Rx is a travel route on which the work vehicle 10 travels forward on a turning route P2a at a turning angle d1 (for example, 90 degrees) to the left from a terminal end p1 of the travel route Rb2, on which the work vehicle 10 travels straight on a straight route P2b in the left direction from a terminal end p2 of the turning route P2a, on which the work vehicle 10 travels reversely on a straight route P2c from a terminal end p3 of the straight route P2b, and on which the work vehicle 10 travels forward on a turning route P2d in the left direction from a terminal end p4 of the straight route P2c toward a start end p5 of the next travel route Rb3.

Figure 15B:
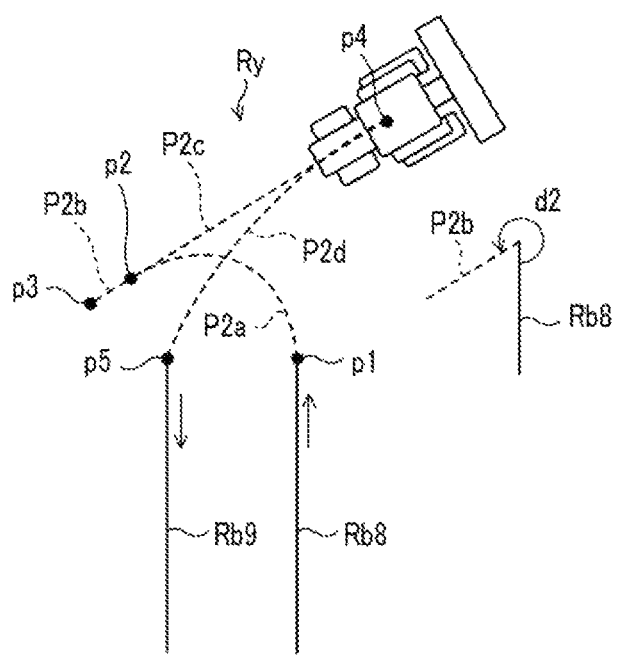
FIG. 15B is a view illustrating an example of the turning route of the work vehicle according to the second embodiment of the present invention.

Meanwhile, as illustrated in FIG. 15B, the turning route Ry is a travel route on which the work vehicle 10 travels forward on the turning route P2a at a turning angle d2 (here, d2>d1) to the left from the terminal end p1 of the travel route Rb8, on which the work vehicle 10 travels straight on the straight route P2b in the left direction from the terminal end p2 of the turning route P2a, on which the work vehicle 10 travels reversely on the straight route P2c from the terminal end p3 of the straight route P2b, and on which the work vehicle 10 travels forward on the turning route P2d in the left direction from the terminal end p4 of the straight route P2c toward the start end p5 of the next travel route Rb9. The turning angle d2 for the forward turning in the turning route Ry is set as a larger angle than the turning angle d1 for the forward turning in the turning route Rx. Here, as illustrated in FIG. 12, the turning angle d2 is set to an angle at which the work vehicle 10 does not enter the already cultivated region (for example, the already cultivated region on the travel route Rb7) at the time of traveling reversely on the straight route P2c.

Figure 12:
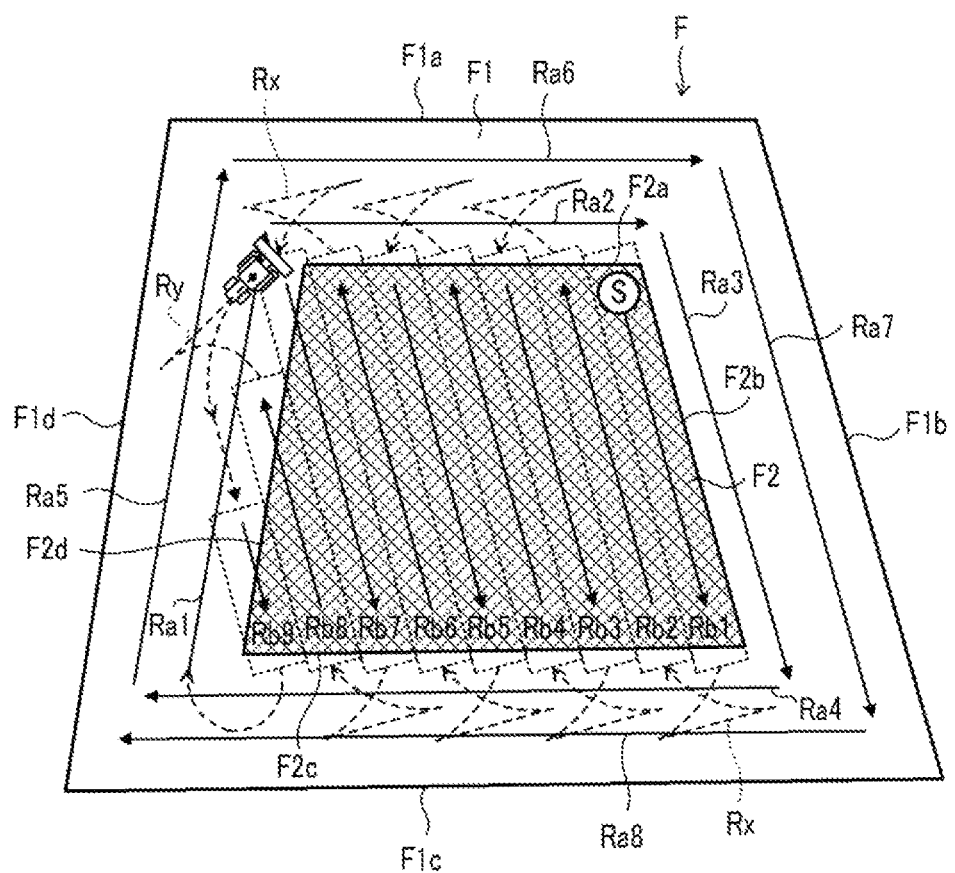
FIG. 12 is a view illustrating an example of the travel route of the work vehicle according to the second embodiment of the present invention.

With the configuration illustrated in FIG. 12, it is possible to prevent the entry into the already cultivated region Y8 illustrated in FIG. 11 and to improve the work efficiency. Here, when the turning angle d2 is increased, the straight route P2 (see FIG. 15B) is extended, which possibly reduces the work efficiency. For this reason, the turning setting processing section 217 may set the turning route Ry illustrated in FIG. 13.

Figure 13:
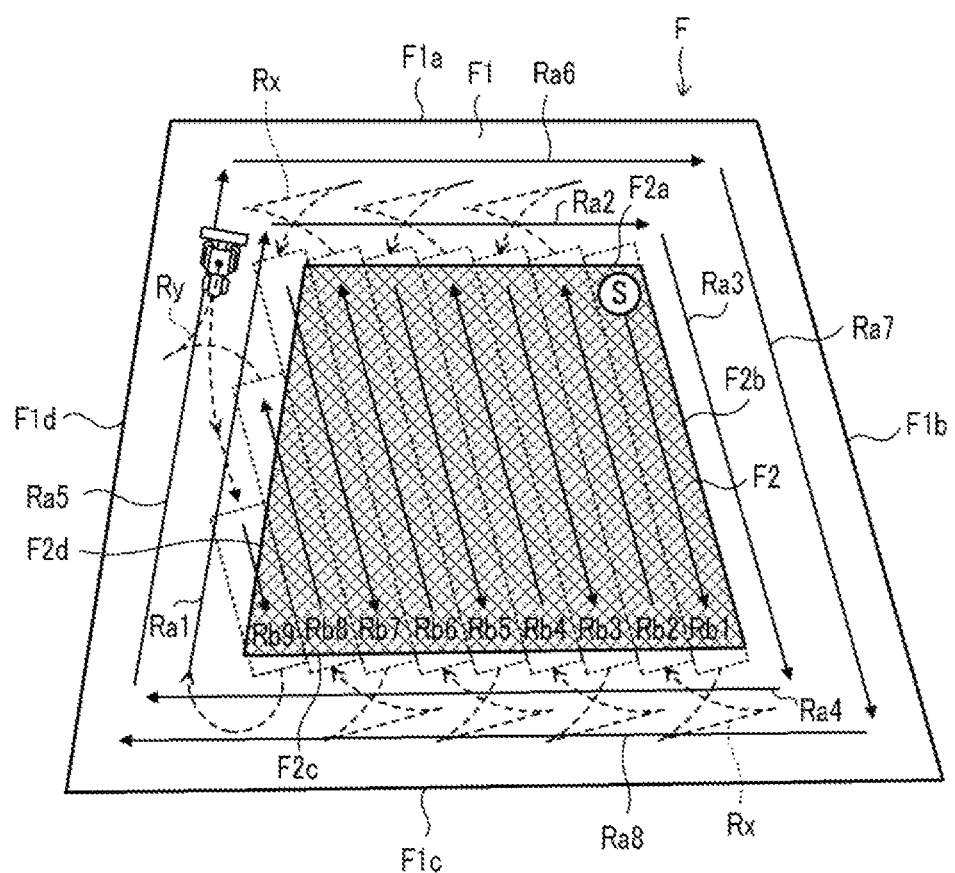
FIG. 13 is a view illustrating an example of the travel route of the work vehicle according to the second embodiment of the present invention.
Figure 15C:
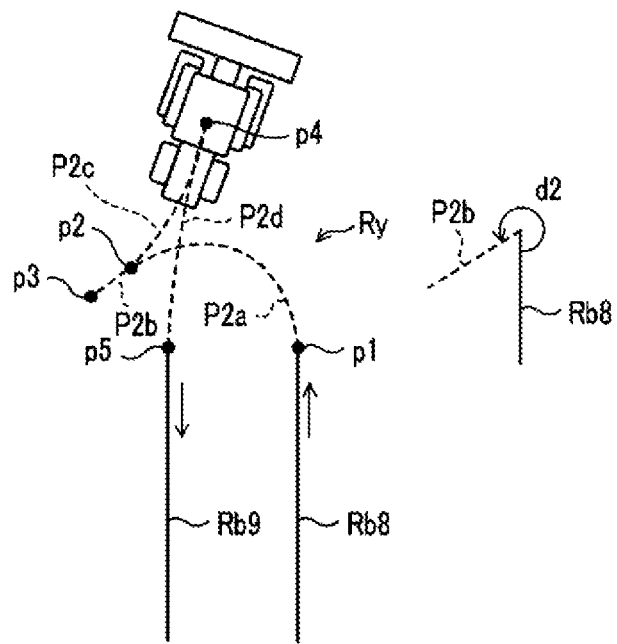
FIG. 15C is a view illustrating an example of the turning route of the work vehicle according to the second embodiment of the present invention.

As illustrated in FIG. 15C, the turning route Ry illustrated in FIG. 13 is a travel route on which the work vehicle 10 travels forward on the turning route P2a at the turning angle d2 (here, d2>d1) to the left from the terminal end p1 of the travel route Rb8, on which the work vehicle 10 travels straight on the straight route P2b in the left direction from the terminal end p2 of the turning route P2a, on which the work vehicle 10 travels reversely on the turning route P2c in a right direction from the terminal end p3 of the straight route P2b, and on which the work vehicle 10 travels forward on the turning route P2d in the left direction from the terminal end p4 of the turning route P2c toward the start end p5 of the next travel route Rb9.

That is, the turning route Ry includes the forward turn (the turning routes P2a, P2d) and the reverse turn (the turning route P2c). Here, the turning route P2d may be a straight route. Meanwhile, the turning route Rx (see FIG. 15A) includes the forward turn (the turning routes P2a, P2d) and the reverse straight travel (the straight route P2c) but does not include the reverse turn.

With the configuration illustrated in FIG. 13, it is possible to prevent the entry into the already cultivated region Y8 illustrated in FIG. 11. In addition, compared to the configuration illustrated in FIG. 12, it is possible to reduce the length of the route P2c. That is, it is possible to reduce the moving distance between the adjacent travel routes. Therefore, it is possible to improve the work efficiency of the work vehicle 10. Here, the turning setting processing section 217 may set the turning route Ry illustrated in FIG. 12 when the turning angle d2 is smaller than a predetermined angle, and may set the turning route Ry illustrated in FIG. 13 when the turning angle d2 is equal to or larger than the predetermined angle.

Figure 14:
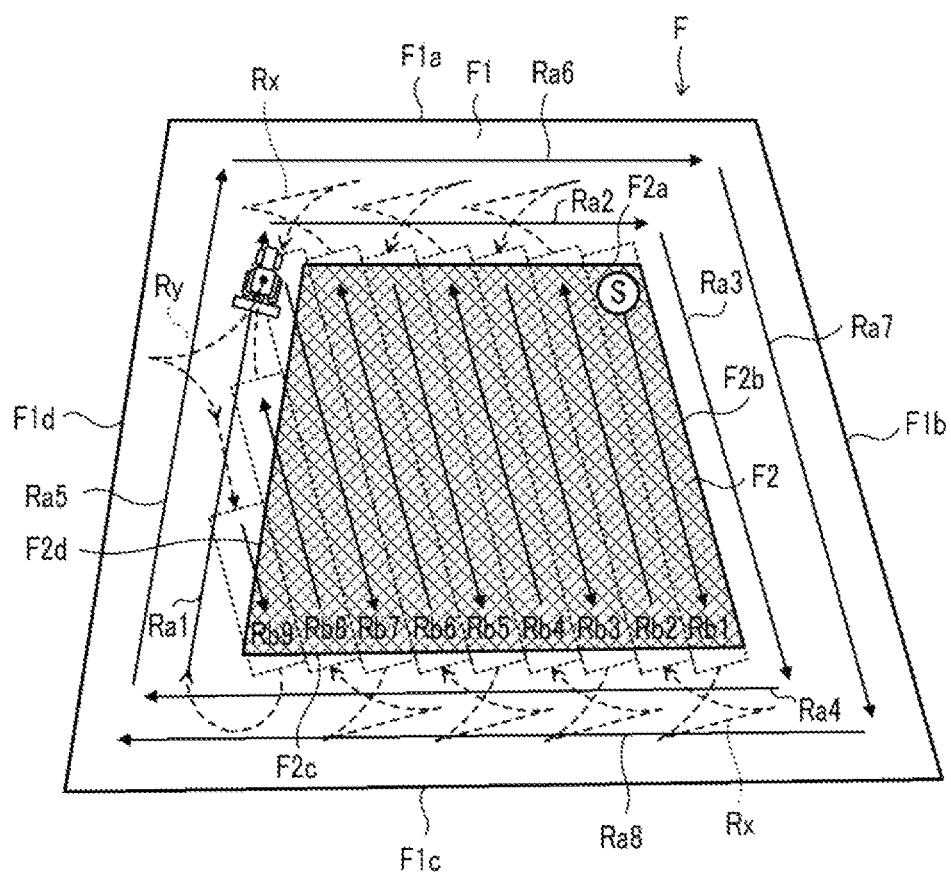
FIG. 14 is a view illustrating an example of the travel route of the work vehicle according to the second embodiment of the present invention.

As another embodiment, the turning setting processing section 217 may set the turning route Ry illustrated in FIG. 14.

Figure 15D:
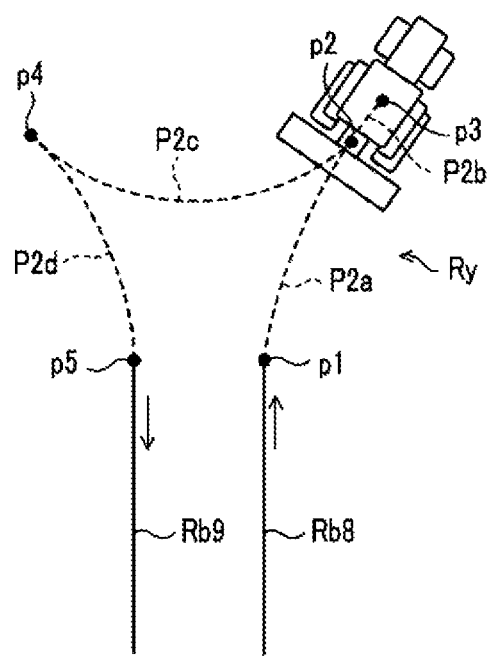
FIG. 15D is a view illustrating an example of the turning route of the work vehicle according to the second embodiment of the present invention.

As illustrated in FIG. 15D, the turning route Ry illustrated in FIG. 14 is a travel route on which the work vehicle 10 travels forward on the turning route P2a in the right direction along the left side F2d from the terminal end p1 of the travel route Rb8, on which the work vehicle 10 travels forward on the turning route P2a in the right direction along the left side F2b from the terminal end p1 of the travel route Rb8, on which the work vehicle 10 travels straight on the straight route p2b in the right direction from the terminal end p2 of the turning route P2a, on which the work vehicle 10 travels reversely on the turning route P2c in the left direction from the terminal end p3 of the straight route P2b, and on which the work vehicle 10 travels forward on the turning route P2d in the right direction from the terminal end p4 of the turning route P2c toward the start end p5 of the next travel route Rb9. Also, with the configuration illustrated in FIG. 14, it is possible to prevent the entry into the already cultivated region Y8 illustrated in FIG. 11 and to improve the work efficiency.

Here, the travel route Rb, on which the already cultivated region is generated, is such a travel route that the terminal end of the travel route Rb is located near the side (the left side F2d), which opposes the adjacent side (the right side F2b) to the work start route (the travel route Rb1). In the above example, the travel route Rb, on which the already cultivated region is generated, is the travel route Rb8 of the travel routes Rb7 to Rb9, each of which crosses the left side F2d. Accordingly, in each of the above-described embodiments, the turning setting processing section 217 may set the turning route Ry for the travel route Rb8, and may set the turning route Rx for each of the travel routes Rb7, Rb9. More specifically, of the plural travel routes, each of which crosses the first side adjacent to the work start route, the turning setting processing section 217 may set the turning route Ry for the travel route, the terminal end of which is positioned near the first side, and may set the turning route Rx for the travel route, the terminal end of which is not positioned near the first side.

The autonomous travel system according to the present invention can be applied to a mode in which the first embodiment and the second embodiment described above are combined. For example, the turning setting processing section 217 may set any of the turning routes in FIGS. 15B, 15C, and 15D for the travel route Rb8, which is included in the travel route R illustrated in FIG. 4. In addition, in this case, the travel route generation processing (see FIG. 10) includes a step of setting the turning route, and in the step, the control unit 21 sets the turning routes Rx, Ry.

The autonomous travel system according to the present invention may not have the configuration that reduces the overlapping region and is described in the first embodiment. That is, the autonomous travel system according to the present invention may only have the configuration that prevents the entry into the already cultivated region and is described in the second embodiment.

In the case where the autonomous travel system only has the configuration that prevents the entry into the already cultivated region and is described in the second embodiment, the present invention can be expressed as follows.

The autonomous travel system includes: the work region setting processing section that sets the first work region and the second work region in the farm field that is the work target of the work vehicle and has such a shape that at least one pair of the opposing sides of the plural sides defining the farm field is not parallel, the first work region corresponding to the shape of the farm field, and the second work region being positioned on the outer side of the first work region; the work direction setting processing section that sets the work direction of the work vehicle in the first work region; the turning setting processing section that sets the turning route of the work vehicle; and the route generation processing section that generates the travel route of the work vehicle in the first work region on the basis of the work direction set by the work direction setting processing section and the turning route set by the turning setting processing section, in which the turning setting processing section sets: the first turning route for the travel route, which crosses the first side opposing the adjacent side to the first travel route, on which the work vehicle first travels from the work start position, in the first work region from among a plurality of sides defining the first work region; and the second turning route, the turning method for which differs from that for the first turning route, for the travel route, which crosses the side other than the first side.

The invention claimed is:

1. A processor-implemented autonomous travel method comprising:
  setting a first work region and a second work region in a farm field that is a work target of a work vehicle and has such a shape that at least one pair of opposing sides of a plurality of farm field sides defining the farm field is not parallel, the first work region corresponding to a shape of the farm field, and the second work region being positioned on an outer side of the first work region;
  setting a work direction of the work vehicle in the first work region;
  setting a first travel route, on which the work vehicle first travels from a work start position in the first work region, positioned adjacent to a first work region side, which is parallel to the work direction, of a plurality of first work region sides defining the first work region;
  generating a travel route of the work vehicle in the first work region on the basis of the work direction and the first travel route; and
  maneuvering the work vehicle along the first travel route.

2. The autonomous travel method according to claim 1 further comprising:
  setting the first travel route positioned adjacent to the first work region side, which is parallel to the work direction and is longest of the plurality of first work region sides defining the first work region.

3. The autonomous travel method according to claim 1 further comprising:
  performing, by the work vehicle, work on the first work region after performing the work on the second work region,
  setting the first travel route positioned to be adjacent to the first work region side, which is parallel to the work direction and is closest to a work end position in the second work region.

4. The autonomous travel method according to claim 1 further executing:
  calculating a required work time on the farm field by assuming that, for each of the first work region sides defining the first work region, the first travel route is set at an adjacent position and parallel to a respective first work region side, and setting the first travel route positioned adjacent to the first work region side, with which the required work time is shortest.

5. The autonomous travel method according to claim 1 further comprising:
  calculating a size of an overlapping region between a work path in the first work region and a work path in the second work region in the case where it is assumed that, for each of the first work region sides defining the first work region, the first travel route is set at an adjacent position and parallel to a respective first work region side, and setting the first travel route positioned adjacent to the first work region side, with which the overlapping region is smallest.

6. The autonomous travel method according to claim 1 further comprising:
  setting the work direction on the basis of a user's operation to register the work direction.

7. The autonomous travel method according to claim 6 further comprising:
  setting a first corner of a plurality of corners included in the first work region as the work start position, wherein at the first corner, such a positional relationship is established that the first travel route is adjacent to at least one of the first work region sides defining the first work region.

8. The autonomous travel method according to claim 7 further comprising:
  setting the first travel route on the basis of the work start position.

9. The autonomous travel method according to claim 7, wherein
  the work vehicle includes a work machine that is attached thereto in a manner to be offset to a right direction or a left direction, and
  the work start position is set on the basis of an offset direction of the work machine.

10. The autonomous travel method according to claim 1 further comprising:
  setting a turning route of the work vehicle; and
  setting a first turning route for the travel route, which crosses a first work region first side opposite to another first work region side that is adjacent to the first travel route, and, as a second turning route for the travel route, a turning method which differs from that for the first turning route, and crosses a first work region second side distinct from the first work region first side.

11. The autonomous travel method according to claim 10 further comprising:
setting the first turning route so that a terminal end of the first turning route is positioned near the first work region first side, and setting the second turning route so that a terminal end of the second turning route is not positioned near the first side.

12. The autonomous travel method according to claim 10, wherein
the first turning route includes forward turn and reverse turn, and
the second turning route includes the forward turn and reverse straight travel but does not include the reverse turn.

13. The autonomous travel method according to claim 12, wherein
a turning angle of the forward turn included in the first turning route is set to a larger angle than a turning angle of the forward turn included in the second turning route.

14. The method of claim 1, wherein the at least one pair of opposing sides comprise a first side and a second side, and wherein:
setting the work direction of the work vehicle in the first work region comprises setting the work direction of the work vehicle to a direction that is either parallel to the first side or parallel to the second side; and
setting the first travel route comprises setting the first travel route to be adjacent to the set work direction.

15. An autonomous travel system comprising:
a work region setting processing section that sets a first work region and a second work region in a farm field that is a work target of a work vehicle and has such a shape that at least one pair of opposing sides of a plurality of farm field sides defining the farm field is not parallel, the first work region corresponding to a shape of the farm field, and the second work region being positioned on an outer side of the first work region;
a work direction setting processing section that sets a work direction of the work vehicle in the first work region;
a route setting processing section that sets a first travel route, on which the work vehicle first travels from a work start position in the first work region, positioned adjacent to a first work region side, which is parallel to the work direction, of a plurality of first work region sides defining the first work region;
a route generation processing section that generates a travel route of the work vehicle in the first work region on the basis of the work direction set by the work direction setting processing section and the first travel route set by the route setting processing section; and
a control section that maneuvers the work vehicle along the first travel route.

16. A non-transitory computer-readable medium comprising instructions for causing one or plural processors to execute autonomous travel method comprising:
setting a first work region and a second work region in a farm field that is a work target of a work vehicle and has such a shape that at least one pair of opposing sides of a plurality of farm field sides defining the farm field is not parallel, the first work region corresponding to a shape of the farm field, and the second work region being positioned on an outer side of the first work region;
setting a work direction of the work vehicle in the first work region;
setting a first travel route, on which the work vehicle first travels from a work start position in the first work region, positioned adjacent to a first work region sides defining the first work region;
generating a travel route of the work vehicle in the first work region on the basis of the work direction and the first travel route; and
maneuvering the work vehicle along the first travel route.

* * * * *